United States Patent
Lim et al.

(10) Patent No.: US 8,380,377 B2
(45) Date of Patent: Feb. 19, 2013

(54) METHOD FOR CONTROLLING COOLING OF POWER CONVERTER FOR HYBRID ELECTRIC VEHICLE

(75) Inventors: Jong Kyung Lim, Gyeonggi-do (KR); Byeong Seob Song, Gyeonggi-do (KR); Hong Seok Song, Gyeonggi-do (KR); Ki Jong Lee, Gyeonggi-do (KR); Shin Hye Chun, Gyeonggi-do (KR); Won Kyoung Choi, Gyeonggi-do (KR); Hyong Joon Park, Gyeonggi-do (KR); Joon Hwan Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 428 days.

(21) Appl. No.: 12/730,449

(22) Filed: Mar. 24, 2010

(65) Prior Publication Data

US 2011/0118917 A1    May 19, 2011

(30) Foreign Application Priority Data

Nov. 17, 2009   (KR) .................. 10-2009-0110699

(51) Int. Cl.
*B60K 6/22* (2007.10)
*H02M 7/48* (2007.01)

(52) U.S. Cl. ........................................ 701/22

(58) Field of Classification Search ............ 701/22
See application file for complete search history.

(56) References Cited

U.S. PATENT DOCUMENTS

| | | | |
|---|---|---|---|
| 5,341,077 A * | 8/1994 | Chen et al. ............... | 318/434 |
| 6,464,026 B1 * | 10/2002 | Horsley et al. ........... | 180/65.25 |
| 6,664,751 B1 * | 12/2003 | Gabriel et al. ........... | 318/599 |
| 6,889,516 B2 * | 5/2005 | Sasaki et al. ............. | 62/259.2 |
| 7,789,794 B2 * | 9/2010 | Hong et al. ............... | 477/3 |
| 2003/0130772 A1 * | 7/2003 | Yanagida et al. ........ | 701/22 |
| 2004/0069546 A1 * | 4/2004 | Lou et al. ................. | 180/65.2 |
| 2008/0212345 A1 * | 9/2008 | Yamashita et al. ...... | 363/50 |

FOREIGN PATENT DOCUMENTS

| | | | | |
|---|---|---|---|---|
| JP | | 04112601 A | * | 4/1992 |
| JP | | 07213091 A | * | 8/1995 |
| JP | | 08033104 A | * | 2/1996 |
| JP | | 2003-274509 A | | 9/2003 |
| JP | | 2003274509 A | * | 9/2003 |
| JP | | 2005-297714 A | | 10/2005 |
| JP | | 2006-156056 A | | 6/2006 |
| JP | | 2007294508 A | * | 11/2007 |
| KR | 10-2005-0069054 | | | 7/2005 |

* cited by examiner

*Primary Examiner* — James Trammell
*Assistant Examiner* — David Testardi
(74) *Attorney, Agent, or Firm* — Edwards Wildman Palmer LLP; Peter F. Corless

(57) ABSTRACT

A method for controlling a cooling system for controlling a power converter of a hybrid electric vehicle includes: estimating the temperature of a power converter at the time of a CAN communication error as a current temperature of the power converter and controlling a cooling system at a cooling rate based on the estimated temperature; and controlling the cooling rate of the cooling system depending on whether an output of the power converter is greater than a reference value. According to the method, the cooling system can be more effectively controlled.

3 Claims, 4 Drawing Sheets

METHOD FOR CONTROLLING COOLING OF POWER CONVERTER FOR HYBRID ELECTRIC VEHICLE

CROSS-REFERENCE TO RELATED APPLICATION

This application claims under 35 U.S.C. §119(a) the benefit of Korean Patent Application No. 10-2009-0110699 filed Nov. 17, 2009, the entire contents of which are incorporated herein by reference.

BACKGROUND (a) Technical Field

The present disclosure relates to a method for controlling a cooling system for cooling a power converter of a hybrid electric vehicle. More particularly, it relates to a method for controlling a cooling system for cooling a power converter of a hybrid electric vehicle by estimating the temperature of the power converter based on its state in the event of a controller area network (CAN) communication error in the power converter.

(b) Background Art

A hybrid vehicle is driven by an internal combustion engine and an electric motor thereby reducing exhaust gas and improving overall fuel efficiency.

A powertrain system of a parallel type hybrid electric vehicle is described with reference to FIG. 4.

An engine 10, a motor 12, and an automatic transmission 14 are directly connected to a drive shaft 16, a clutch 18 is disposed between the engine 10 and the motor 12, and a high voltage battery 20 capable of being charged and discharged by a battery controller 22 is connected to the motor 12 through an inverter 24.

Also, a 12V auxiliary battery 26 is connected to a connecting line between the battery 20 and the inverter 24 through a DC-DC converter 28 (hereinafter referred to as "LDC").

Further, a cooling system 30 (e.g., cooling fan or water pump) and a cooling system controller 32 are provided to cool the inverter 24 and the LDC 28 which constitute a hybrid power converter.

Here, the battery controller 22, the inverter 24, the LDC 28, and the cooling system controller 32 are connected to each other through a controller area network (CAN) communication line 36 for signal interface.

Therefore, the battery controller 22, the inverter 24, the LDC 28, and the cooling system controller 32 can transmit and receive information to and from each other through the CAN communication. As shown in the flowchart of FIG. 2, the cooling system controller 32 receives temperature information of each hybrid system through the CAN communication and controls the operation of the cooling system 30 based on the information.

As such, instead of an alternator, the LDC 28 for charging the 12V auxiliary battery and controlling the power supply to an electronic circuit and the inverter 24 for controlling the motor for driving the vehicle are provided in the hybrid electric vehicle. The LDC 28 and the inverter 24, i.e., the hybrid power converter, include a temperature sensor (not shown) for measuring the internal temperature. The measured temperature data is transmitted to the cooling system controller 32 for controlling the cooling system 30 through the CAN communication.

In a normal state, the hybrid power converter transmits the information of the temperature sensor to the cooling system controller through the CAN communication, and the cooling system controller controls the cooling system by determining the cooling rate based on the received temperature of each power converter.

However, in the event of a CAN communication error in the power converter, the temperature information detected by the temperature sensor in the power converter cannot be transmitted through the CAN communication line, and thereby the cooling system controller cannot receive the temperature information. As a result, it is impossible to provide an over-temperature protection of the power converter.

That is, the cooling system controller for controlling the cooling system sets the operation of the cooling system at the maximum to prevent the power converter from overheating in the event of a CAN communication error. However, such a strategy is problematic since it significantly increases the operating noise of the cooling system and causes unnecessary power consumption of the cooling system.

In other words, in the event of a CAN communication error in the hybrid power converter, the cooling system controller controls the cooling system (e.g., cooling fan or water pump) at the maximum capacity to allow the cooling system to cool the power converter regardless of the actual temperature of each power converter. This cooling logic causes excessive noise in the cooling system and reduces the durability and efficiency of the cooling system.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a method for controlling a cooling system for cooling a power converter of a hybrid electric vehicle. The temperature of a power converter at the time of a CAN communication error is estimated as a current temperature of the power converter and a cooling system is controlled based on the estimated temperature. Whether an output generated by the power converter is greater than a minimum operating output level is determined. Here, the minimum operating output level may be a reference value at which an over-temperature protection logic is executed. If it is determined that the output of the power converter is greater than the minimum operating output level, it means that the actual cooling rate of the power converter is not insufficient. In this case, the cooling rate of the cooling system is controlled to a one-step lower level. On the other hand, if it is determined that the output of the power converter is not greater than the minimum operating output level, it means that the actual cooling rate of the power converter is insufficient. In this case, the cooling rate of the cooling system is controlled to a one-step higher level.

Preferably, the over-temperature protection logic may detect, at an internal temperature sensor of the power converter, an over-temperature. If the over-temperature is detected, the logic may suitably reduce the temperature of the power converter by limiting the output of the power converter below the minimum operating output value.

Suitably, the cooling rate of the cooling system may be reduced when the over-temperature protection logic is completed as the temperature of the power converter is returned to a normal operating level.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
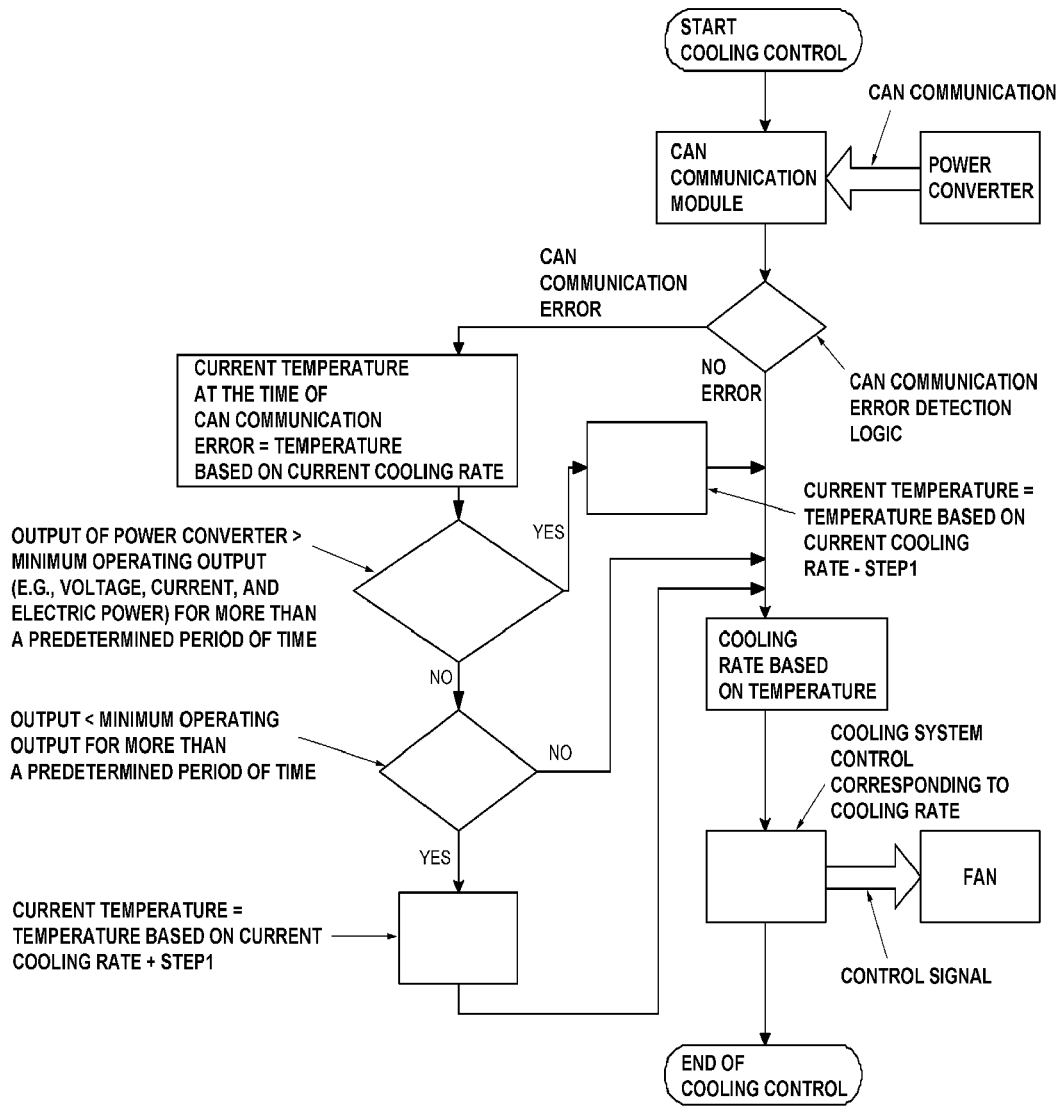
FIG. 1 is a flowchart illustrating a method for controlling a cooling system for cooling a power converter of a hybrid electric vehicle in accordance with an exemplary embodiment of the present invention.
Figure 2:
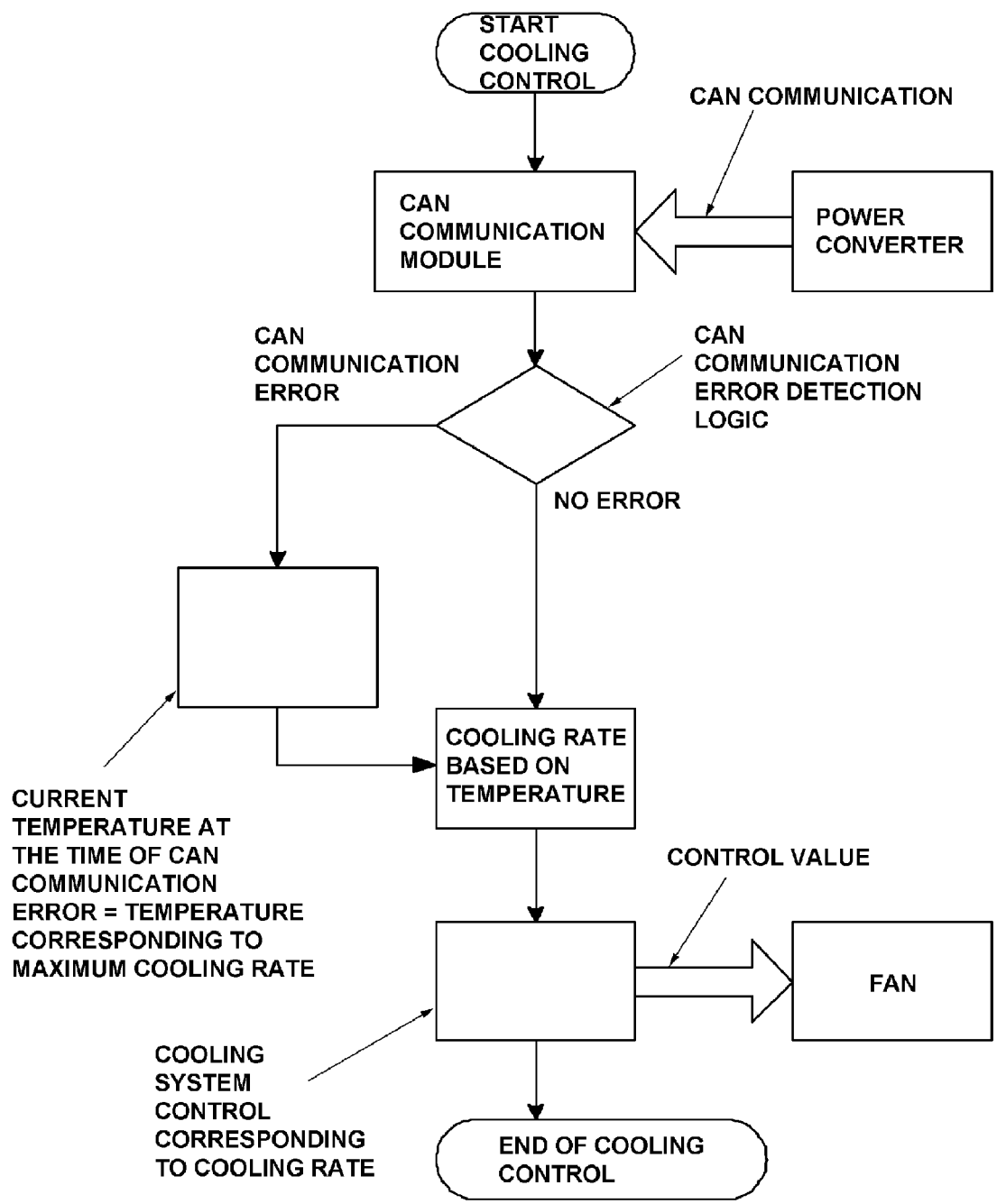
FIG. 2 is a flowchart illustrating a conventional method for controlling a cooling system for cooling a power converter of a hybrid electric vehicle.

Reference numerals set forth in the Drawings includes reference to the following elements as further discussed below:

| | |
|---|---|
| 10: | engine |
| 12: | motor |
| 14: | automatic transmission |
| 16: | drive shaft |
| 18: | clutch |
| 20: | battery |
| 22: | battery controller |
| 24: | inverter |
| 26: | 12 V auxiliary battery |
| 28: | DC-DC converter |
| 30: | cooling system |
| 32: | cooling system controller |
| 36: | CAN communication line |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 4:
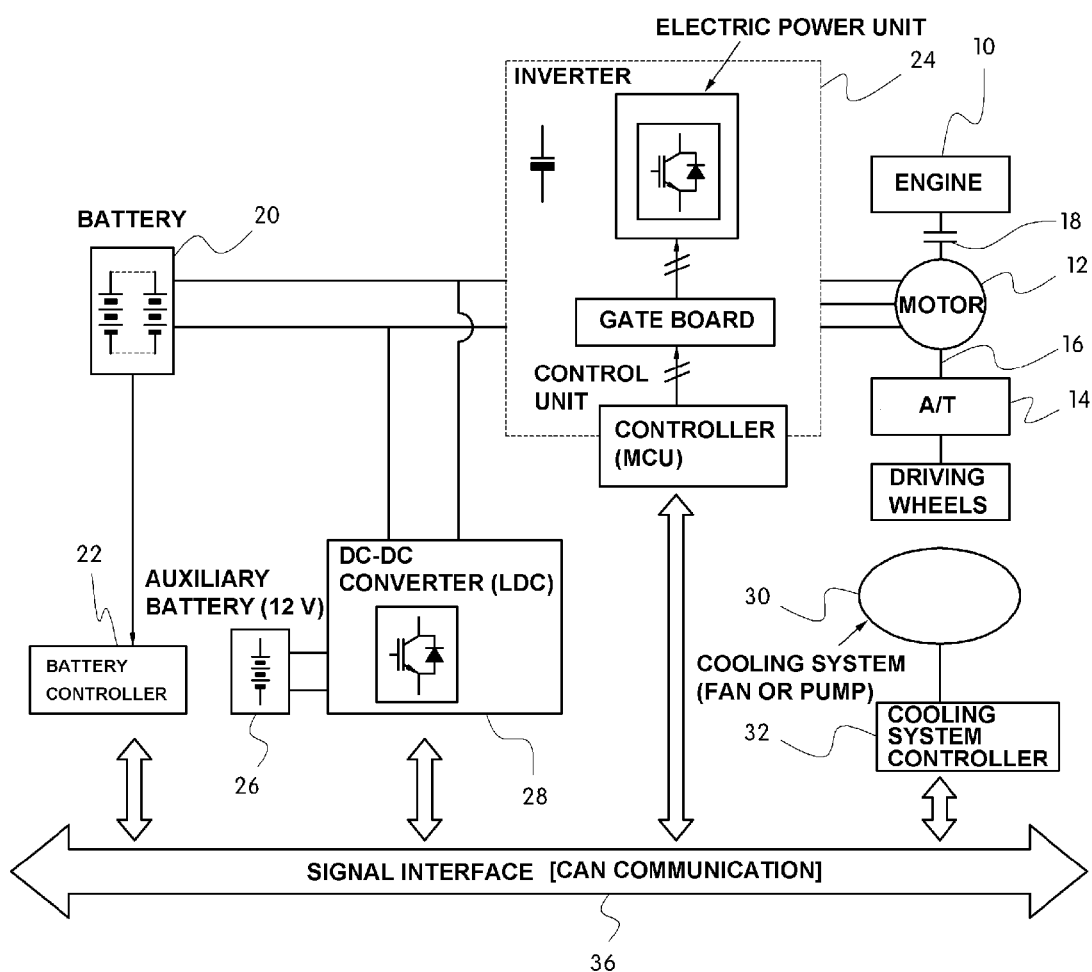
FIG. 4 is a schematic diagram illustrating a powertrain system of a hybrid electric vehicle.

As mentioned above with reference to FIG. 4, the powertrain system of the hybrid electric vehicle includes the cooling system 30 (e.g., cooling fan or water pump) and the cooling system controller 32 to cool the inverter 24 and the LDC 28 which constitute the hybrid power converter. The inverter 24, the LDC 28, and the cooling system controller 32 as well as various controllers (e.g., battery controller) are connected to each other by the CAN communication line 36 for signal interface.

Therefore, the control of the cooling system 30 for cooling the power converter is performed in such a manner that the temperature information of the power converter is transmitted to the cooling system controller 32 through the CAN communication line 36 and then the cooling system controller 32 controls the cooling system 30 to provide a cooling rate based on the temperature information.

The temperature information of the power converter and the cooling rate of the cooling system may be divided into a predetermined number of steps such that the cooling rate of the cooling system is controlled based on the temperature of the power converter to cool the power converter. As an example, shown in FIG. 3, the temperature information of the power converter may be divided into seven steps T1 to T7, and the cooling rate based on the temperature information may be divided into seven steps Step-1 to Step-7.

However, in the event of a CAN communication error in the power converter, the cooling system controller cannot receive the temperature information. To cope with this, its control logic is configured to control the cooling rate at a specific level, i.e., at the maximum level (T7, Step-7). Since this type of control method controls the cooling rate to the maximum level regardless of the actual temperature of the power converter, it consumes an excessive amount of fan load and is very disadvantageous to fan noise and durability.

To this end, the present invention aims at providing a more effective cooling control in the event of a CAN communication error in the power converter.

Of course, in the present invention, when the CAN communication is normally performed, the cooling system controller receives the temperature information of the power converter and controls the cooling rate of the cooling system based on the information.

A method for controlling a cooling system for cooling a power converter in the event of a CAN communication error according to an embodiment of the present invention is described below with reference to FIGS. 1 and 3.

Referring to FIG. 1, according to the method, in the event of a CAN communication error, the cooling temperature at the time when the CAN communication error occurs is estimated as an initial temperature by using a cooling control map and the estimated temperature is used to control the cooling system (e.g., cooling fan).

Figure 3:
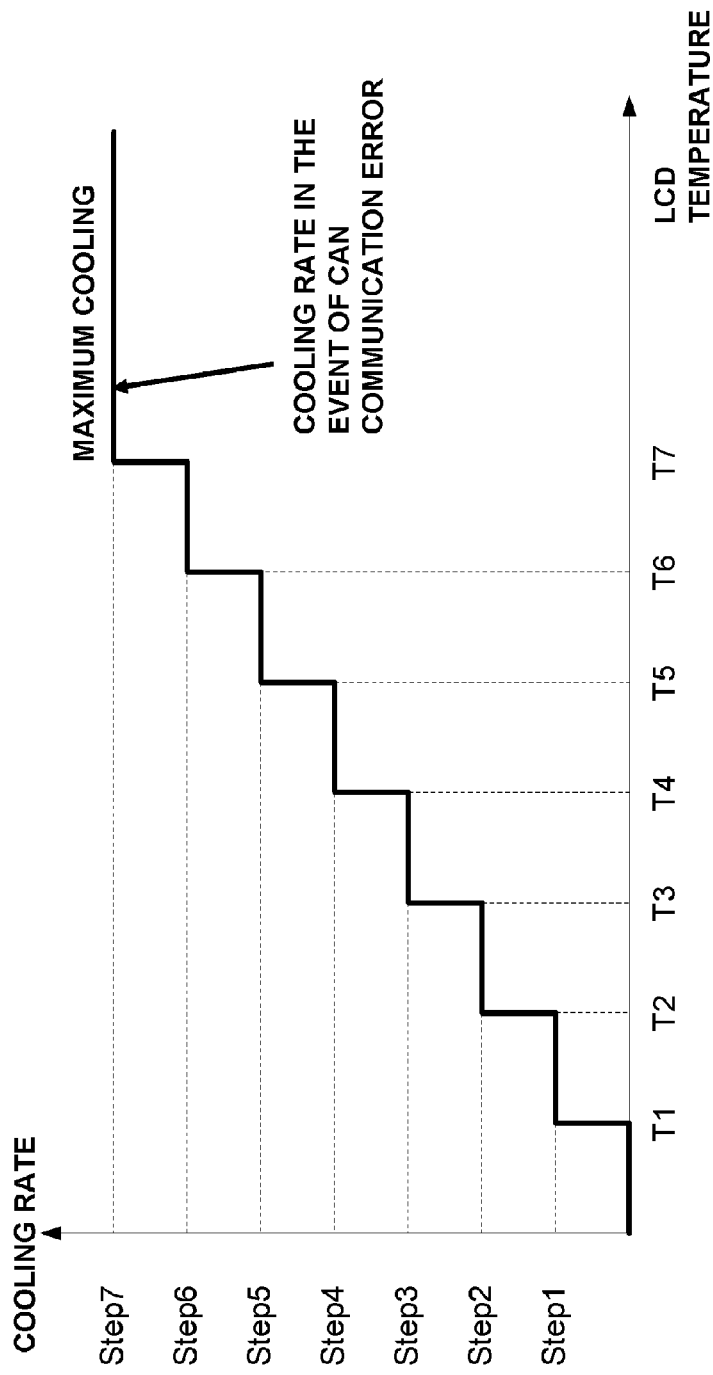
FIG. 3 is a graph illustrating the conventional method for controlling a cooling system for cooling a power converter of a hybrid electric vehicle.

For example, referring to FIG. 3, if the temperature of the power converter at the time of the CAN communication error is T4 and the cooling rate of the cooling system (e.g., cooling fan) according to the temperature T4 is Step-4, the cooling system controller estimates the temperature T4 corresponding to Step-4, which is the current cooling rate at the time of the CAN communication error, as an initial temperature (i.e., the current temperature of the power converter) and controls the speed of the cooling fan to maintain the cooling rate Step-4 according to the initial temperature.

Meanwhile, in case where an internal temperature sensor of each power converter detects an over-temperature condition while the temperature of the corresponding power converter increases due to a decrease in the actual cooling rate by the power converter, a separate over-temperature protection logic is operated, and the output (e.g., voltage, current, and electric power) of the power converter is limited to a predetermined reference value or lower by the over-temperature protection logic to reduce the temperature of the power converter.

The cooling system controller may detect that the output of the power converter is changed by the over-temperature protection logic since the power converter and the cooling system controller both are connected to the 12 V auxiliary battery in a line.

In this case, when the power converter generates an output (e.g., voltage, current, and electric power) greater than a reference value (i.e., a minimum operating output) of the over-temperature protection logic, it is determined that the actual cooling rate of the power converter is not insufficient, in which case the cooling system controller controls the speed of the cooling fan to a one-step lower level.

That is, the speed of the cooling fan is controlled to a level one step lower than the thus estimated initial temperature, i.e., the cooling rate based on the current temperature of the power converter, to reduce the noise and power consumption of the cooling fan.

On the contrary, when the power converter generates an output (e.g., voltage, current, and electric power) smaller than the reference value (i.e., a minimum operating output) of the over-temperature protection logic, it is determined that the actual cooling rate of the power converter is insufficient, in which case the cooling system controller controls the speed of the cooling fan to a one-step higher level to thereby rapidly cool the power converter.

That is, when it is determined that the output of the power converter is smaller than the reference value, the temperature of the power converter is estimated as the temperature corresponding to a value increased by one step from the current cooling rate thereby to allow the cooling system to rapidly perform the cooling operation.

Here, when the over-temperature protection logic is completed as the temperature of the power converter is returned to a normal operating level after the speed of the cooling fan is controlled to a one-step higher level to cool the power converter, if the output of the power converter is maintained in a normal range for a predetermined period of time or longer, the cooling rate is reduced, and in such a way, it is possible to flexibly control the cooling fan under various conditions.

According to the present invention, it is possible to prevent the power converter from overheating in the event of a CAN communication error by estimating the current temperature of the power converter to provide a cooling rate based on the estimated temperature and detecting an output value according to the over-temperature protection logic of the power converter to increase or reduce the cooling rate.

Especially, in the event of a CAN communication error in the power converter (e.g., inverter and DC-DC converter), it is possible to reduce the noise and power consumption of the cooling system (e.g., cooling fan) and improve the durability and efficiency of the cooling system by detecting an over-temperature state based on the output (e.g., voltage, current, and electric power) of the power converter to control the cooling rate based on the detected state, rather than by controlling the cooling rate of the cooling system to the maximum level.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling a cooling system for cooling a power converter of a hybrid electric vehicle, the method comprising:
    receiving temperature information related to a power converter, via a controller area network (CAN), when the controller area network (CAN) communication is normally performed, and controlling a cooling rate of a cooling system based on the received temperature information;
    estimating the temperature of the power converter at the time of a CAN communication error as a current temperature of the power converter and controlling the cooling system at a cooling rate based on the estimated temperature;
    determining whether the power converter generates an output greater than a minimum operating output level as a reference value at which an over-temperature protection logic is executed,
    controlling the cooling rate of the cooling system to a one-step lower level if it is determined that the power converter generates an output greater than the minimum operating output level, and;
    controlling the cooling rate of the cooling system to a one-step higher level if it is determined that the power converter generates an output not greater than the minimum operating output level,
    wherein, when an internal temperature sensor of the power converter detects an over-temperature condition while the temperature of the power converter increases due to a decrease in the actual cooling rate of the power converter, the over-temperature protection logic is operated, and the output of the power converter is limited below the minimum operating output level by the over-temperature protection logic to reduce the temperature of the power converter.

2. The method of claim 1, wherein the over-temperature protection logic performs detecting, at an internal temperature sensor of the power converter, an over-temperature and reducing, when the over-temperature is detected, the temperature of the power converter by limiting the output of the power converter below the minimum operating output value.

3. The method of claim 1, further comprising reducing the cooling rate of the cooling system when the over-temperature protection logic is completed as the temperature of the power converter is returned to a normal operating level.

* * * * *